Figure 1:
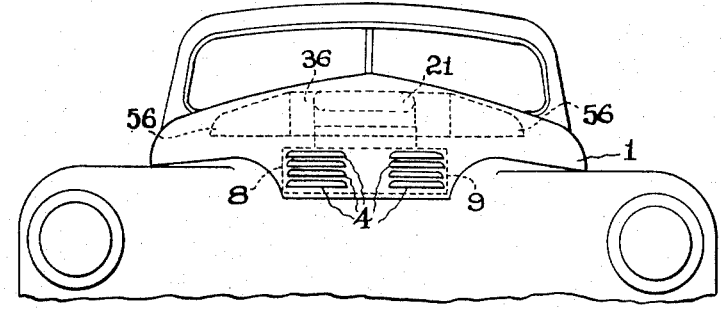

Jan. 10, 1956 L. S. GREENMUN 2,730,032
VENTILATION SYSTEM FOR AUTOMOBILES AND THE LIKE
Original Filed Feb. 25, 1948 2 Sheets-Sheet 1

INVENTOR.
LEO S. GREENMUN
BY
*Ihrward Ornstein*
ATTORNEY

Jan. 10, 1956          L. S. GREENMUN          2,730,032
VENTILATION SYSTEM FOR AUTOMOBILES AND THE LIKE
Original Filed Feb. 25, 1948          2 Sheets-Sheet 2
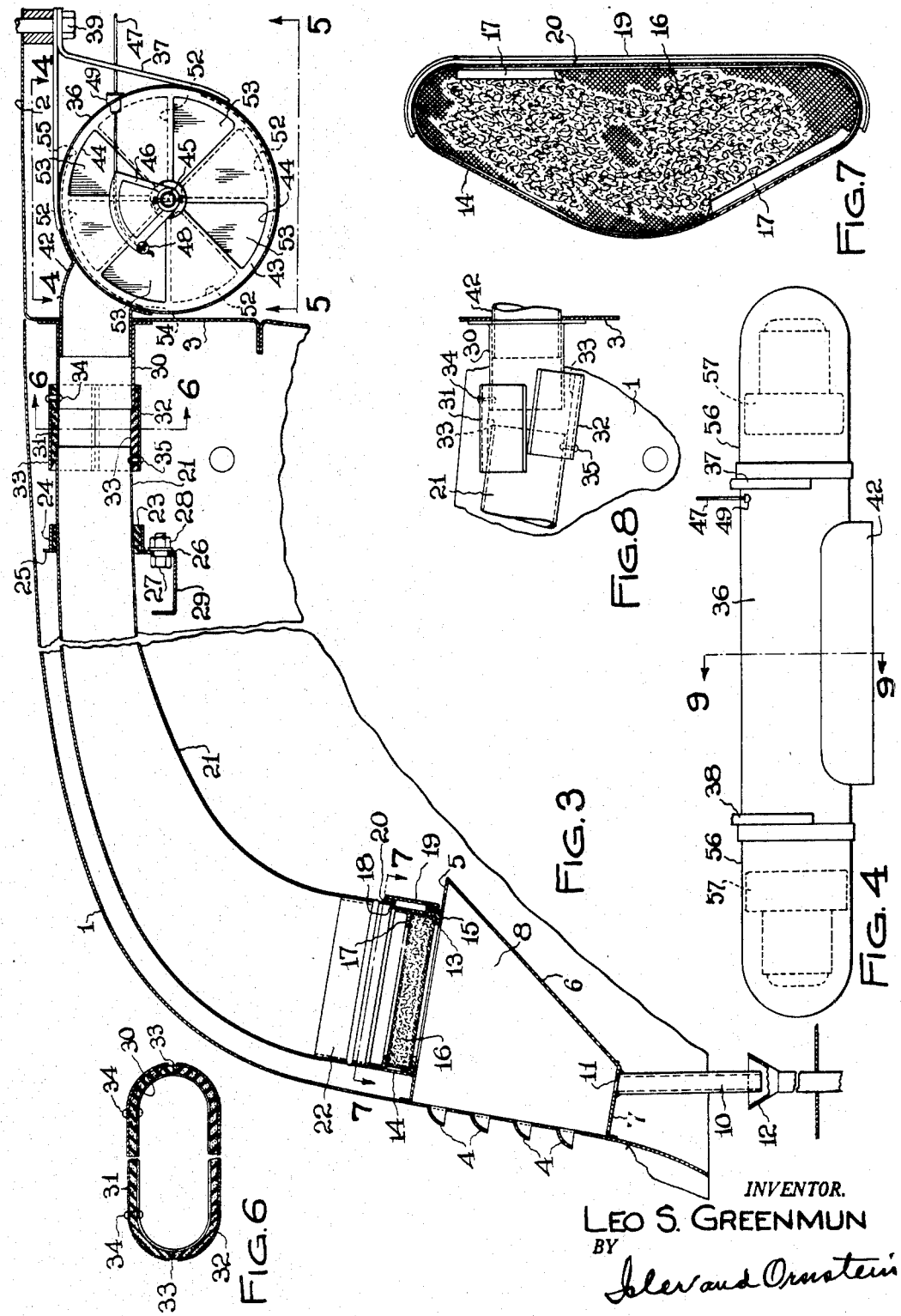
INVENTOR.
LEO S. GREENMUN
BY
*Isler and Ornstein*
ATTORNEY

United States Patent Office 2,730,032
Patented Jan. 10, 1956

2,730,032

VENTILATION SYSTEM FOR AUTOMOBILES AND THE LIKE

Leo S. Greenmun, Cleveland, Ohio

Original application February 25, 1948, Serial No. 10,645, now Patent No. 2,634,669, dated April 14, 1953. Divided and this application March 10, 1953, Serial No. 341,581

5 Claims. (Cl. 98—2)

This invention relates, as indicated, to a ventilation system for automobiles and the like.

Ventilation systems of the conventional types are characterized by numerous disadvantages. In the cowl type of ventilator, the ventilator is located out of the path of maximum air flow, and in an area of low air pressure, so that the ventilation provided is extremely inefficient. Air intakes placed along the sides of the hood or body of the car are inefficient for substantially the same reasons. The principal consideration, in each case, is to locate the air intake at the most convenient position, and this tendency has resulted in low efficiency, complicated and costly installations, high installation costs, and difficult and vexing service problems.

In virtually all instances, the air intakes have the common fault that they must be closed in hot, humid, rainy weather, to avoid the entry of water into the car. They may be tightly closed when the car is new, but when the car has been in service for some period, considerable trouble is experienced in servicing these intakes to maintain them water-tight. Moreover, if the car is left standing for any length of time, dust and dirt accumulate about the vents, and when the vents are opened, the occupants of the car are showered with this dust and dirt.

In cowl intakes, a complicated control consisting of levers and links is required to operate the same, so that the driver, in order to open or close the intake, is required to grope for the lever, takes his eyes off the road, and sometimes turns the steering wheel, thereby creating a driving hazard.

In conventional types of air control boxes or valves, which are in use on several makes of cars, the construction, in most cases, is extremely complicated. Most of these embody a myriad of parts, all of which are potential sources of rattling and service troubles. On some makes of cars, a minimum of 8 hours is required at service stations to install the control box and heaters. These filter only the air which goes to the blowers. The air passing into the direct air inlet to the space behind the dashboard of the car is not filtered. These devices, moreover, are extremely costly to manufacture, and add 8 to 10 pounds of manufactured parts to the car.

The present invention has as its primary object the provision of a ventilation system for automobiles which overcomes virtually all of the aforesaid disadvantages.

Other objects and advantages of the invention will be apparent during the course of the following description.

Figure 2:
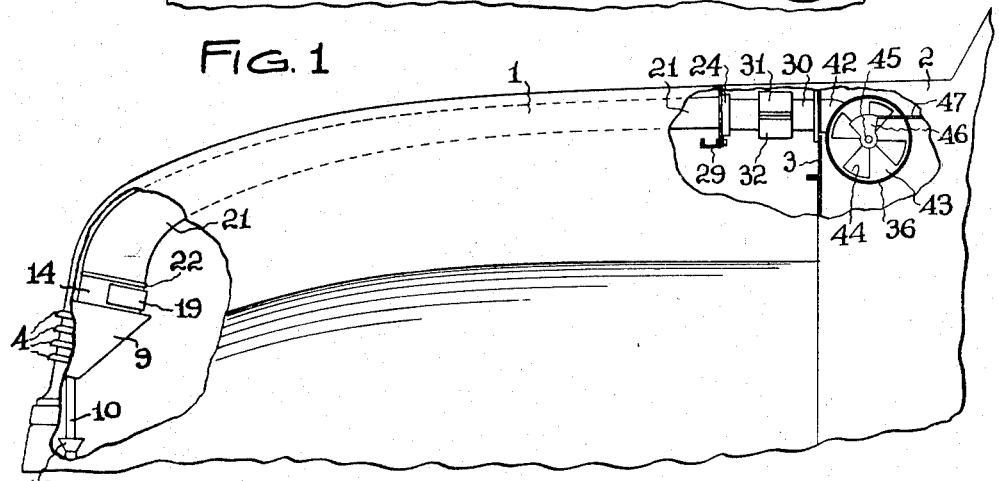

In the accompanying drawings, forming a part of this specification, and in which like numerals are employed to designate like parts throughout the same, Fig. 1 is a fragmentary front elevational view of an automobile embodying my novel ventilating system, Fig. 2 is a fragmentary side elevational view of an automobile embodying the invention, with portions thereof broken away to better show portions of the ventilating system, Fig. 3 is a view similar to Fig. 2, but on an enlarged scale, showing the ventilating system in substantially longitudinal cross-section.

Fig. 4 is a top plan view of the air distributor or air control valve, as seen in the direction indicated by the line 4—4 of Fig. 3.

Figure 5:
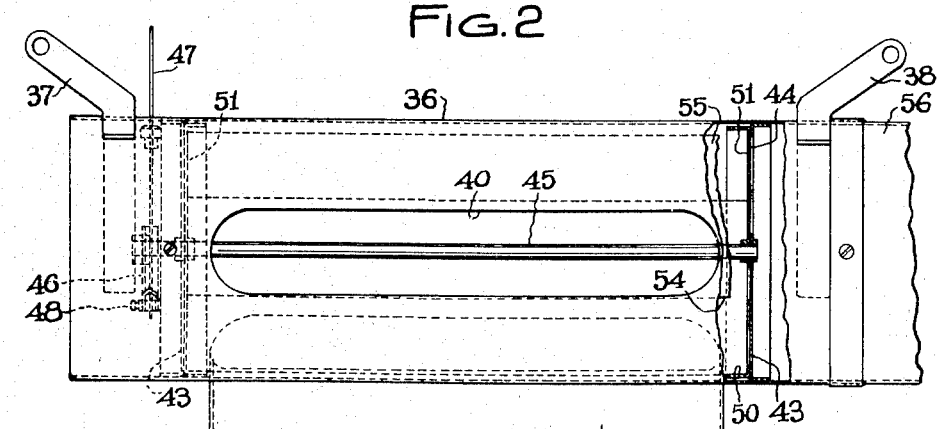
Figures 9, 10:
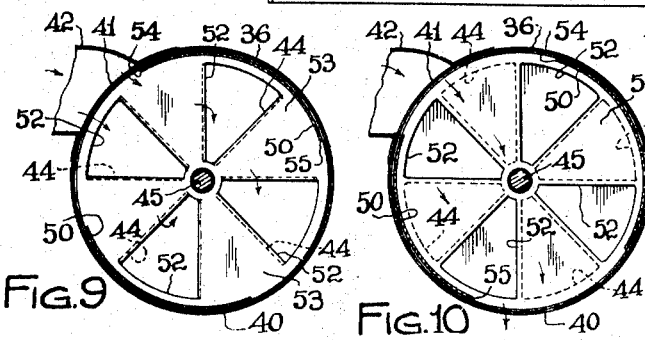

Fig. 5 is a bottom plan view of the air distributor or air control valve, as seen in the direction indicated by the line 5—5 in Fig. 3, with portions broken away to show details of construction, Fig. 6 is a cross-sectional view, taken on the line 6—6 of Fig. 3, Fig. 7 is a cross-sectional view, taken on the line 7—7 of Fig. 3, Fig. 8 is a fragmentary side-elevational view, showing the position certain of the parts forming the joint in the air intake tube assume when the hood of the automobile is raised, Fig. 9 is a cross-sectional view through the control valve, taken on approximately the line 9—9 of Fig. 4, but with the valve cylinder in the "first" position, and Fig. 10 is a view similar to Fig. 9, but with the valve cylinder in "second" position.

The ventilating system, as herein described, has been designed especially for the 1946 Chrysler sedan, but it may, with but slight modifications, be generally adapted to all passenger automobiles.

Referring more particularly to the drawings, and more especially Figs. 1 to 8 inclusive thereof, I have illustrated an automobile comprising a hood 1 of the type which is adapted to be raised by rotation thereof about a horizontal pivot or axis extending transversely to the car, a type which has now come into general use. The cowl of the automobile is designated by reference numeral 2, with the fire wall indicated by reference numeral 3.

For the purposes of the present invention, the front portion or face of the hood 1 is formed to provide transversely spaced groups or sets of louvers 4 which communicate with a manifold box or air intake which is mounted on the hood behind the louvers, said air intake comprising an upper wall 5, a forwardly and downwardly inclined rear wall 6, a rearwardly and downwardly inclined bottom 7, and end walls 8 and 9. A tube 10 extends vertically downward from a drainage opening 11 in the rear portion of the bottom 7, and into a funnel 12, the function of which will appear hereinafter.

The upper wall 5 of the air intake box has a large opening 13 therein and extending upwardly from the wall 5, about this opening is a sheet metal conduit 14. Seated upon the ledge formed between the conduit 14 and the opening 13 is an angle iron frame 15, within which a filter unit 16, preferably of the glass wool type, is disposed. This filter is normally maintained in position by an angle iron frame 17, which is similar to the frame 15. The wall of the conduit 14 has an opening 18, in its rear and side portions, which opening is normally closed by means of a door or plate 19.

In order to permit removal and replacement of the filter unit 16, when necessary, the frame 17 is rigidly connected to the door 19, so as to be removable from the conduit 14 when the door is removed. When the frame 17 is thus removed, the filter unit 16 may be lifted and removed through the opening 18. In order to insure an air-tight connection of the door 19 to the conduit 14, a gasket 20 is interposed between the door and the conduit, as best seen in Figs. 3 and 7.

The conduit 14 is connected to an air conduit 21 by means of a coupling 22 of the type commonly referred to as a "stove-pipe" coupling. The conduit 21 is curved to conform with the general curvature of the hood 1, but gradually diminishes in cross-sectional area, and varies in cross-section, being of generally triangular cross-section in its lower portion, as shown in Fig. 7, and of generally elliptical cross-section at its rearmost portion, as indicated in Fig. 6.

The conduit 21 passes over the radiator and engine (not shown) of the automobile, and if desired, and in order to avoid transfer of heat from the radiator core and engine, the conduit may be suitably heat insulated, or suitable heat-insulating means may be interposed between the conduit and the radiator and engine.

The upper portion of the conduit 21 is supported by a collar or sleeve 23 of sponge rubber or the like, which serves to cushion any shocks which might otherwise be transmitted to the conduit, and to deaden any noises which might be transmitted by the conduit. This sleeve or collar 23 is encased within a metal sleeve 24 provided with a flange 25 from which an ear 26 depends. The ear 26 is secured, as by means of a bolt 27 and nut 28 to one of the flanges of a channel beam 29, which is supported by and secured to the hood 1 of the automobile.

The rear end of the conduit 21 is normally in axial alignment with a short tubular member 30 of substantially the same cross-sectional shape as the rear end of the conduit 21 and which is rigidly secured to the fire wall 3 of the automobile.

In order to provide an air-tight seal between the air outlet end of the conduit 21 and the front or inlet end of the tubular member 30, a pair of shields 31 and 32 is provided which surround the space between the conduit 21 and member 30 and overlap the ends of said conduit and member. The shields 31 and 32 are of substantially semi-elliptical cross-section, and when the conduit 21 and member 30 are in axial alignment with each other, as in Fig. 3, these shields conjointly form a tube which is coaxial with the conduit 21 and member 30. This seal is made more effective by providing the inner surfaces of the shields 31 and 32 with sponge rubber 33 or the like.

In order to permit relative movement between the conduit 21 and member 30, as when the hood 1 is raised, the shield 31 is secured, as by means of rivets 34, to the member 30, and the shield 32 is secured, as by means of rivets 35, to the conduit 21. This relative movement, in its early stages, is more or less diagrammatically illustrated in Fig. 8, and in this connection, it will be noted that separation is effected with a minimum exposure of the joint or space between the ends of the conduit 21 and member 30. The sponge rubber linings 33 are also effective in avoiding the transmission of vibration from the conduit 21 to the tubular member 30.

Disposed behind the firewall 3 and underneath the cowl 2 is the air control valve of the present invention. This valve comprises a cylinder 36 which is rigidly supported by means of brackets 37 and 38, which are connected, as by bolts 39, to parts of the automobile behind the dashboard, as indicated in Fig. 3.

The cylinder is provided in its bottom portion with an elongated air outlet opening 40, and in its upper front portion with a similar elongated air inlet opening 41, which communicates with the tubular member 30 by means of a conduit 42.

Disposed within each of the open ends of the cylinder 36 is a circular path 43, each of which, as clearly shown in Fig. 3, is provided with a plurality of circumferentially-spaced sector-shaped openings 44. The plates 43 are rigidly secured within the cylinder, as by welding, rivets or the like. Extending axially through the cylinder 36 and with its ends journalled in the plates 43, is a shaft 45. One end of the shaft 45 extends beyond one of the plates 43 and has rigidly secured thereto a sector-shaped crank 46, to which a Bowden wire 47 is secured, as at 48. This wire extends through a bushing 49, and to a knob or handle on the dashboard of the automobile, so that by pushing or pulling on such knob or handle, the shaft 45 may be rocked to a plurality of predetermined or selected positions.

Rigidly secured to the shaft 45 is a second cylinder 50 which is disposed within the cylinder 36 and is concentric with the latter, being provided with ends 51 which are in contiguity with the plates 43, as best seen in Fig. 5. Each of the ends 51 is provided with a plurality of circumferentially-spaced sector-shaped openings 52, the number of openings 52 in each end being equivalent to the number of openings 44 in the contiguous plate 43. The portions of the ends 51 intermediate the openings 52 form sector-shaped closure plates 53.

The cylinder 50 fits snugly within the cylinder 36 and has diametrically-opposite portions thereof cut away or removed to provide an elongated air inlet opening 54 and an elongated air outlet opening 55. Each of the openings 54 and 55 extends nearly one-fourth of the circumference of the cylinder 50, as clearly shown in Figs. 9 and 10.

The ends of the cylinder 36 are adapted to be connected to the ventilating blowers with which the automobile, in this case, a Chrysler sedan, is usually equipped, connections to such blowers being diagrammatically indicated by the conduits 56 (Figs. 1 and 5), it being understood, however, that the air may be passed directly into the interior of the automobile from the ends of the cylinder 36 without passing through blowers, if this is desired.

The use or operation of the ventilating system, as thus described, will be fairly obvious, but may be briefly described as follows:

While the automobile is in motion, air will pass through the louvers 4 and will pass into the air intake box, passing from such box upwardly through the filter 16 and into the conduit 21. Rain and moisture which passes through the louvers will strike the inclined rear wall 6 of the air intake box and fall by gravity to the bottom 7 of the box, passing into the tube 10 and funnel 12, thence to the ground. Some of the moisture may condense on the lower surface of the filter 16, but such moisture will be removed in the same manner as the moisture which strikes the wall 6 of the air intake box. In any event, the air which passes through the filter 16 and into the conduit 21 will be free from dirt, dust and moisture and in a condition well-suited for car ventilation purposes.

In the position of the cylinder 50 shown in Fig. 3, which may be referred to as the "closed" position, of the ventilator, the passage of air from the conduit 42 into the cylinder 50 is blocked by the cylinder 50, and, at the same time, the openings 44 in the plates 43 are blocked or closed by the portions 53 of the ends 51 of the cylinder 50, so that air within the cylinder 50 cannot pass through the openings 44 and thence to the blowers. Moreover, the outlet opening 40 in the cylinder 36 is blocked by the cylinder 50, so that air from the cylinder 50 cannot pass through the opening 40.

Upon pulling the wire 47 to what may be referred to as the "first" position, the cylinder 50 assumes the position shown in Fig. 9 of the drawings, in which position, the opening 54 of the cylinder 50 is in registration with the opening 41 in the cylinder 36, so that air passes from the conduit 42 into the cylinder 50. At the same time, the openings 52 in the ends 51 of the cylinder 50 are brought into registration with the openings 44 in the plates 43, so that the aforesaid air can pass into the conduits 56 and thence to the blowers. It will be noted that in this position of the cylinder 50, the opening 40 in the cylinder 36 is blocked by the cylinder 50, so that all of the air entering the cylinder 50 is forced to the blowers and no air can pass through the opening 40.

Upon pulling the wire 47 to what may be referred to as the "second" position, the cylinder 50 assumes the position shown in Figure 10 of the drawings, in which position, the opening 54 of the cylinder 50 is still in registration with the opening 41 in the cylinder 36, so that air passes from the conduit 42 into the cylinder 50. At the same time, the portions 53 of the ends 51 of the cylinder 50 are brought into registration with the openings 44 in the plates 43, so that no air can pass into the conduits 56 and thence to the blowers. However, the opening 55 of the cylinder 50 is brought into registration with the opening 40 of the cylinder 36, so that all of the air entering the cylinder 50 passes through the opening 40 and thence into the car.

It is thus seen that I have provided for a variety of ventilating conditions, and that by utilizing positions of the cylinder 50 intermediate those described, greater or lesser amounts of air can be brought into the car, depending on weather requirements and driving conditions.

The advantages of the present ventilation system will be readily apparent. The air intake is located in the nose of the hood, and at a sufficient distance from the road to insure against entry of road dust and dirt into the system. This location, moreover, is in an area of high air pressure, so that maximum efficiency is obtained for the ventilation system as a whole.

With the aforesaid arrangement of the air intake, air is picked up at high velocity when the car is in motion, so that the blowers to which reference has been made need not be used, except when the car is parked, and could, in fact, be eliminated, thereby effecting a material saving in cost of the car.

The ventilation system, as previously stated, is virtually rainproof, and filtered air is available at all times, irrespective of weather conditions.

The system is quickly and easily installed, and room for ease of installation and servicing is provided by virtue of the fact that the air duct is spaced above the motor.

The air control valve has numerous advantages, among which may be mentioned the fact that it handles not only filtered air which goes to the blowers, but also filtered air which goes directly into the car and by-passes the blowers. The control valve, moreover, is extremely light in weight, and is made of a minimum number of parts, which are easy to manufacture and assemble. It can be quickly and easily installed, and is virtually noise-free.

Among other advantages may be mentioned the fact that the control valve may be installed within the car in about one hour, rattles are eliminated due to the simplicity of construction of the valve, a net saving in weight of at least 8 pounds is effected, and driving hazards are completely eliminated.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

The application is a division of my copending application, Serial No. 10,645, filed February 25, 1948, now Patent No. 2,634,669.

I claim:

1. In a ventilation system for automobiles and the like, an elongated cylinder extending transversely of the automobile, stationarily supported on the automobile and having an elongated air inlet opening in its front wall, a conduit for admitting air into said opening, said cylinder having a similar elongated air outlet opening in the bottom wall thereof, plates mounted in the ends of said cylinder, said plates having circumferentially-spaced air outlet openings therein, a second cylinder disposed within said first cylinder and rotatable in said first cylinder, said second cylinder having elongated air inlet and air outlet openings in diametrically-opposite walls thereof, said second cylinder having ends disposed in contiguous relation to the plates of said first cylinder and having circumferentially-spaced air inlet openings in said ends equivalent in number and substantially coextensive in size with the air outlet openings in said plates.

2. A ventilation system, as defined in claim 1, and means for rotating said second cylinder to a plurality of predetermined or preselected positions.

3. A ventilation system, as defined in claim 2, in which each of the openings in the diametrically-opposite walls of said second cylinder extend circumferentially substantially twice the circumferential extent of each of the air inlet and air outlet openings in the wall of the first cylinder, and in which said second cylinder is rotatable to at least three positions, in the first of which the passage of air from the conduit into the second cylinder is blocked by the second cylinder, the air outlet openings in the plates are blocked by the ends of the second cylinder, and the elongated air outlet opening in the first cylinder is blocked by the second cylinder, in the second of which air passes from said conduit through the elongated air inlet openings of both cylinders and from the second cylinder through said ends and plates, but the elongated air outlet opening of the first cylinder is blocked by the second cylinder, and in the third of which air passes from said conduit through the elongated air inlet openings of both cylinders and from the second cylinder through the elongated air outlet openings of both cylinders, but the air outlet openings in the plates are blocked by the ends of the second cylinder.

4. A ventilation system, as defined in claim 3, in which said second cylinder is rigidly secured to a shaft which is journalled in the ends of the first cylinder.

5. A ventilation system, as defined in claim 4, in which said shaft has a crank secured thereto, and a Bowden wire connects said crank with a knob or handle on the dashboard or instrument panel of the automobile.

References Cited in the file of this patent

UNITED STATES PATENTS

| | | |
|---|---|---|
| 232,166 | Bales | Sept. 14, 1880 |
| 557,607 | Reynolds | Apr. 7, 1896 |
| 1,479,303 | Kirch | Jan. 1, 1924 |
| 1,548,390 | Schloe | Aug. 4, 1925 |
| 1,666,569 | Kelch et al. | Apr. 17, 1928 |
| 1,687,645 | Diederich | Oct. 16, 1928 |
| 2,116,981 | Peo | May 10, 1938 |
| 2,309,202 | Moore | Jan. 26, 1943 |